(12) United States Patent
Ferren et al.

(10) Patent No.: US 7,962,760 B2
(45) Date of Patent: *Jun. 14, 2011

(54) METHOD AND APPARATUS FOR SELECTIVELY ENABLING A MICROPROCESSOR-BASED SYSTEM

(75) Inventors: Bran Ferren, Beverly Hills, CA (US); W. Daniel Hillis, Encino, CA (US)

(73) Assignee: The Invention Science Fund I, Bellevue, WA (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/455,670

(22) Filed: Jun. 4, 2009

(65) Prior Publication Data
US 2009/0327752 A1 Dec. 31, 2009

(51) Int. Cl.
*H04L 9/32* (2006.01)

(52) U.S. Cl. ............ 713/189; 713/1; 713/100; 713/188; 726/2; 726/4; 726/34; 726/36; 712/1; 712/15; 455/411

(58) Field of Classification Search .............. 713/1, 100, 713/173, 188, 189, 194; 726/2, 4, 20, 21, 726/27, 34, 36; 712/1, 15; 455/410, 411
See application file for complete search history.

(56) References Cited

U.S. PATENT DOCUMENTS

| | | | |
|---|---|---|---|
| 5,388,156 A | | 2/1995 | Blackledge, Jr. et al. |
| 5,406,261 A | | 4/1995 | Glenn |
| 5,574,786 A | | 11/1996 | Dayan et al. |
| 5,748,083 A | | 5/1998 | Rietkerk |
| 5,790,074 A | | 8/1998 | Rangedahl et al. |
| 5,887,131 A | * | 3/1999 | Angelo ........................ 726/20 |
| 5,956,633 A | * | 9/1999 | Janhila ........................ 455/410 |
| 5,966,446 A | | 10/1999 | Davis |
| 6,125,446 A | | 9/2000 | Olarig et al. |
| 6,138,005 A | | 10/2000 | Park |
| 6,166,888 A | | 12/2000 | Tsuda et al. |
| 6,370,629 B1 | | 4/2002 | Hastings et al. |
| 6,370,649 B1 | | 4/2002 | Angelo et al. |
| 6,418,472 B1 | | 7/2002 | Mi et al. |

(Continued)

OTHER PUBLICATIONS

Robert B. Jones et al, Efficient Validity Checking for Processor Verification, pp. 1-5, IEEE International Conference on Computer-Aided Design (ICCAD), 1995.*

*Primary Examiner* — Nasser Moazzami
*Assistant Examiner* — Shanto M Abedin
(74) *Attorney, Agent, or Firm* — Keller LaPuma Woodard PC

(57) ABSTRACT

A system for selectively enabling a microprocessor-based system is disclosed. State information that describes the operating conditions or circumstances under which a user intends to operate the system is obtained. In the preferred embodiment of the invention, a valid hash value is determined, preferably based on the state information and preferably by locating the valid hash value within a table of valid hash values indexed by the state information. Candidate authorization information is obtained from the user, and a candidate hash value is generated by applying a hashing algorithm to the candidate authorization information, the state information, or a combination of the candidate authorization information and state information. The candidate hash value and the valid hash value are then compared, and the microprocessor-based system is enabled if the candidate hash value matches the valid hash value. In this manner, the designer or distributor of the system can determine, at the time of manufacture or distribution, the conditions and circumstances under which the system may be operated.

12 Claims, 5 Drawing Sheets

U.S. PATENT DOCUMENTS

| | | |
|---|---|---|
| 6,571,335 B1 * | 5/2003 | O'Donnell et al. ............ 713/173 |
| 6,742,129 B1 | 5/2004 | Higgs et al. |
| 6,925,566 B1 | 8/2005 | Feigen et al. |
| 7,526,654 B2 | 4/2009 | Charbonneau |
| 2002/0120845 A1 * | 8/2002 | Cromer et al. ................ 713/168 |
| 2002/0152377 A1 * | 10/2002 | Bauman et al. ............... 713/168 |
| 2003/0005315 A1 * | 1/2003 | Horvat et al. ................. 713/189 |
| 2003/0014658 A1 | 1/2003 | Walker et al. |
| 2003/0014672 A1 * | 1/2003 | Desikamani et al. ......... 713/202 |
| 2003/0063072 A1 | 4/2003 | Brandenberg et al. |
| 2003/0093517 A1 | 5/2003 | Tarquini |
| 2003/0105964 A1 | 6/2003 | Brainard et al. |
| 2004/0003288 A1 * | 1/2004 | Wiseman et al. ............. 713/201 |
| 2004/0010553 A1 * | 1/2004 | Katz et al. .................... 709/206 |
| 2004/0117616 A1 * | 6/2004 | Silvester ....................... 713/155 |
| 2004/0172535 A1 * | 9/2004 | Jakobsson et al. ............ 713/168 |

* cited by examiner

METHOD AND APPARATUS FOR SELECTIVELY ENABLING A MICROPROCESSOR-BASED SYSTEM

For purposes of the USPTO extra-statutory requirements, the present application constitutes a continuation in part of United States Patent Application entitled, METHOD AND APPARATUS FOR SELECTIVELY ENABLING A MICROPROCESSOR-BASED SYSTEM naming W. Daniel Hillis and Bran Ferren as inventors, filed Jun. 4, 2009, application Ser. No. 12/455,673, which is currently, or is an application of which a currently application is entitled to the benefit of the filing date.

TECHNICAL FIELD

The invention relates to microprocessor-based systems. More particularly, the invention relates to enablement of microprocessor-based systems under conditions and circumstances determined by the designer or distributor of the system.

DESCRIPTION OF THE PRIOR ART

In many instances, the designer or distributor of a microprocessor-based system or device may wish to restrict the conditions or circumstances under which the system or device may be operated. For example, a government may provide a microprocessor-based weapons system to a foreign state and wish to control the duration for, or the locations in which, the system may be operated.

One approach to addressing this problem is to restrict the operation of the microprocessor controlling the system or device. Several prior art systems have been suggested to provide such restrictions. For example, U.S. Pat. No. 5,388,156 discloses a system that includes a "a normally closed enclosure, at least one erasable memory element . . . for receiving and storing a privileged access password, . . . a tamper detection switch operatively connected with the erasable memory element, for detecting opening of the enclosure and for invalidating any privileged access password stored in the erasable memory element, . . . and a system processor . . . for controlling access to . . . data stored within the system." The system is operable only when the privileged password is provided. The tamper detection system ensures that attempts to access the privileged password results in destruction of the password.

A different approach is presented in U.S. Pat. No. 5,406,261, where "unauthorized access to a computer system is prevented by controlling power distribution to components within the computer system by a remotely controllable switch. An authorized computer user utilizes a radio frequency, infrared, ultrasonic or other type of wireless coded signal transmitter to send coded signals to a matching wireless receiver within the computer system that controls the power distribution switch." The system also provides a mechanism to thwart attempts to disable or circumvent the activation process.

However, in prior art systems such as these, operation of the system is contingent only upon the presentation of proper authorization information, such as a suitable password or correctly coded signal. What is needed is a method for selectively enabling a microprocessor-based system under conditions or circumstances determined by the designer or distributor of the system at the time of design or distribution.

SUMMARY

The invention selectively enables a microprocessor-based system.

State information describing the operating conditions or circumstances under which a user intends to operate the system is obtained. In the preferred embodiment of the invention, a valid hash value is determined, preferably based on the state information and preferably by locating the valid hash value within a table of valid hash values indexed by the state information. Candidate authorization information is obtained from the user, and a candidate hash value is generated by applying a hashing algorithm to the candidate authorization information, the state information, or a combination of the candidate authorization information and state information. The candidate hash value and the valid hash value are then compared, and the microprocessor-based system is enabled if the candidate hash value matches the valid hash value. In this manner, the designer or distributor of the system can determine, at the time of manufacture or distribution, the conditions and circumstances under which the system may be operated.

The preferred embodiment of the invention further incorporates a power-up sequence that is executed before obtaining the state information and candidate authorization information. In addition, if the candidate authorization information is successfully verified and the system is enabled, operation continues in an uninterrupted manner, with the system periodically checking for a reset condition. If a reset condition is detected, a power-down sequence is executed, and the system awaits a power-up condition. Additional state information may be obtained and stored before the power-down sequence is executed.

The hashing algorithm is preferably a one-way hashing algorithm, and is applied to only the candidate authentication information. In an alternative embodiment, the hashing algorithm is applied to a catenation of the candidate authorization information and the state information. In another alternative embodiment of the invention, several valid hash values are determined, independent of the state information, by referencing a list of valid hash values.

The state information obtained may describe any number of operating conditions or circumstances, such as geographic location, geographic region, date, time, and a prior usage history of the system.

DESCRIPTION

The invention selectively enables the use of a microprocessor-based system by matching candidate authorization information provided by a user to valid authorization information specific to a set of operating conditions or circumstances.

Figure 1:
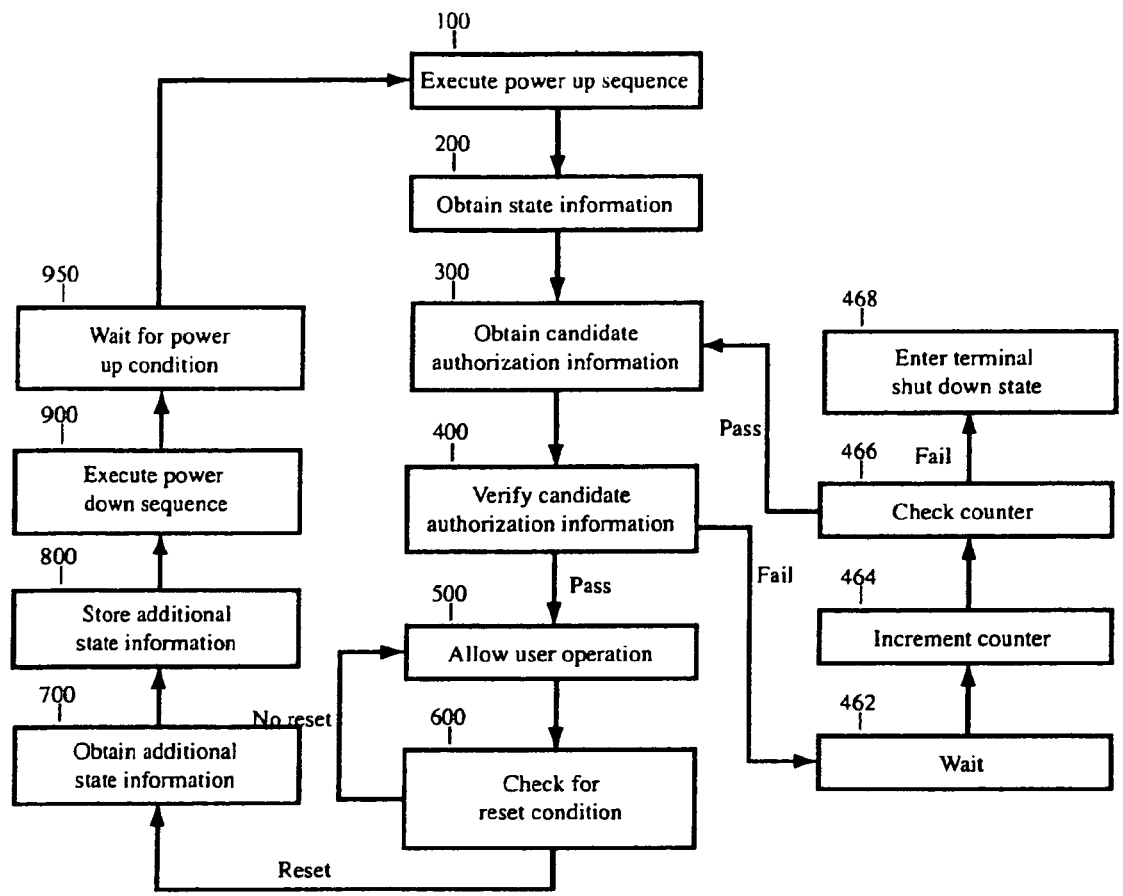
FIG. 1 is a flow chart that shows a method of selectively enabling a microprocessor-based system according to the invention.

FIG. 1 is a flow chart that shows a method of selectively enabling a microprocessor-based system according to the invention. Operation begins when the microprocessor-based system executes a power-up sequence 100. The power-up sequence may be, for example, an initiation of power provided to the system, such as effected by a user toggling a power switch, or may correspond to the system waking up from a lower activity sleep state to a higher activity state.

The microprocessor-based system obtains state information 200. The state information reflects the operating conditions or circumstances under which the user intends to operate the system. The state information may reflect the geographic location, date, or time of intended operation. The state information may also include a history of previously stored state information retrieved from a memory. For example, the state information may indicate the usage history of the system prior to the time of attempted authorization.

To prevent circumvention of the authorization mechanism, the state information is obtained in a manner not subject to tampering by, or interference from, the user. In the case of state information that describes environmental information, such as temperature or location, the state information may be obtained by sensors physically inaccessible to the user. Date and time information may be obtained from a remote time server controlled by the designer or distributor of the system, as is well known in the art. Information detailing the usage history of the system may be retrieved from a tamper resistant, non-volatile memory. Several such memories are described in the prior art and include, for example, EEPROM or battery backed CMOS RAM devices.

The microprocessor-based system obtains candidate authorization information 300 from the user wishing to operate the system. In the preferred embodiment of the invention, the candidate authorization information is a password or passphrase. Other embodiments of the invention may incorporate electronic identification cards or biometric information, for example. The candidate authorization information obtained from the user is specific to the conditions or circumstances under which the user Wishes to operate the system. For example, the user may be prompted for a password or passphrase specific to operation of the system within a particular geographic region or within a particular range of dates.

Once the state information and candidate authorization information have been obtained, the system verifies the candidate authorization information 400. The verification operation determines if the candidate authorization information matches valid authorization information that is specific to the obtained state information.

In the preferred embodiment of the invention, if the verification operation is unsuccessful, the system waits 462 for a predetermined period of time and increments a counter 464 indicating the number of attempted authorizations. The system then checks the counter 466 to determine if the incremented counter value is equal to or less than a predetermined number of maximum allowable attempted authorizations. If the check is successful, the system again obtains candidate authorization information 300 from the user. If the check of the counter fails because the incremented counter value exceeds the maximum allowable number of attempted authorizations, the system enters a terminal shut down state 468. The system remains in the terminal shut down state until it is serviced by the designer or distributor of the system.

If the verification operation is successful, the system allows user operation 500. Continued operation of the system is allowed while the system periodically checks for a reset condition 600. Generally, the reset condition corresponds to an expiration of or change in the state for which operation was selectively enabled. Checking for a reset condition may therefore require that the system obtain state information similar to that obtained following execution of the power-up sequence. For example, the reset condition may correspond to the system being transported outside the geographic region for which operation was enabled, for example as detected by an interval GPS receiver. Alternatively, the reset condition may correspond to the operator exceeding a maximum allowable single-session or cumulative operating time. The reset condition may also be triggered by a power-down of the system, effected either by the user or an unexpected loss of power. The reset condition may also be triggered, for example, if the system detects efforts to circumvent or disable the verification mechanism.

If no reset condition is detected, user operation of the system continues in an uninterrupted manner. If a reset condition is detected, if necessary, the system obtains additional state information 700. Obtaining state information at this point in the operation of the invention provides an accurate record of information, such as usage statistics. The system then stores the additional state information 800 in a tamper resistant, non-volatile memory. Storage of the state information allows retrieval of the information when state information is obtained following the execution of the power-up sequence.

Once any necessary additional state information has been recorded, the system executes a power-down sequence 900. The power-down sequence may result in a stoppage of power provided to the system, or may correspond to the system entering into a lower activity sleep state.

Figure 2:
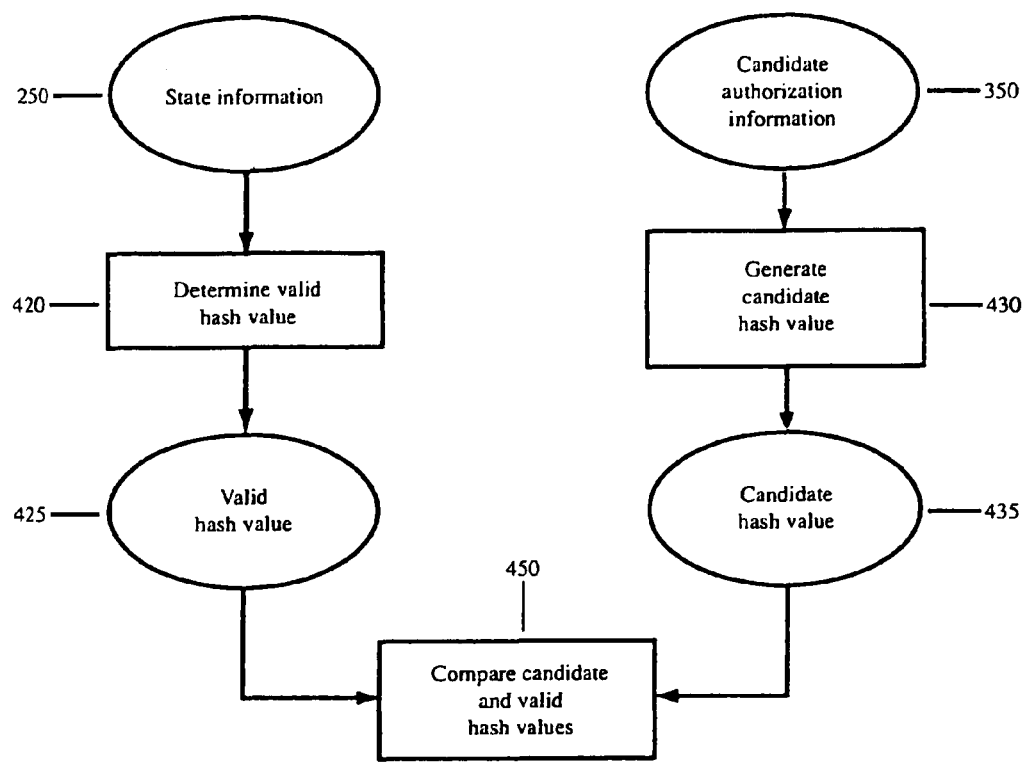
FIG. 2 is a flow chart that shows a verification operation according to the invention.

FIG. 2 is a flow chart that shows a verification operation according to the invention. The state information 250 obtained following execution of the power-up sequence is used to determine 420 a valid hash value 425. The candidate authorization information obtained from the user 350 is used to generate 430 a candidate hash value 435 using a hashing algorithm. The hashing algorithm is preferably a one-way hashing algorithm, such as the MD5 algorithm or other similar algorithm, as is well known in the art. The candidate hash value and the valid hash value are then compared 450. If the candidate hash value and valid hash value match one another, the verification operation is successful. If the candidate hash value and the valid hash value do not match one another, the verification operation is unsuccessful.

It is important to note that while in the preferred embodiment the state information is obtained before the candidate authorization information, in alternative embodiments of the invention the candidate authorization information is obtained before the state information, or the state information and candidate authorization information are obtained simultaneously. It is only essential that both are obtained before verifying the candidate authorization information.

Figure 3:
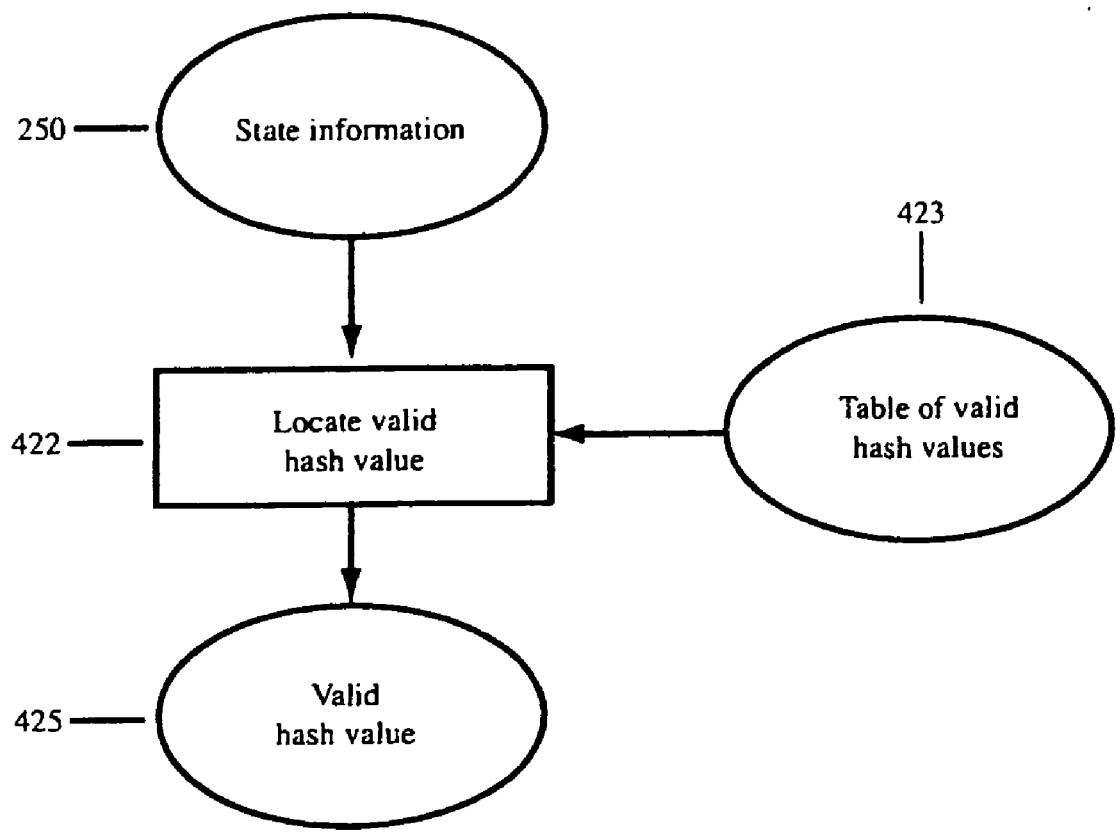
FIG. 3 is a flow chart that shows a method of determining a valid hash value according to the invention.

FIG. 3 is a flow chart that shows a method of determining a valid hash value according to the invention. The state information 250 is used to locate 422 the valid hash value 425 within a table of valid hash values 423 that is indexed by the state information. For example, the table may provide a particular valid hash value for a specific date of operation or range of dates of operation. Alternatively, the table may provide a certain valid hash value for a geographic location or geographic region of operation. The table may specify valid hash values with any desired degree of granularity. For example, the table may specify few valid hash values, each corresponding to an expansive geographic region, or the table may specify many valid hash values, each corresponding to a more limited geographic region.

In this manner, the designer or distributor of the system determines, at the time of manufacture or distribution, the conditions or circumstances under which the system may be operated. Moreover, the designer or distributor determines the granularity with which potential conditions or circumstances of operation are distinguished from one another.

In an alternative embodiment of the invention, the table of hash values is unique to a single unit within a production run of similar systems, and effectively incorporates the identity of the unit within the state information. In this embodiment, the valid authorization information allows a particular unit to be run under particular conditions or circumstances.

The table of hash values is preferably stored in a tamper resistant, non-volatile memory. A further measure of security is offered by the one-way nature of the hashing algorithm, which ensures that the valid candidate authorization information that yields the valid hash value cannot be determined from entries in the table of valid hash values. Thus, were a user to gain access to the table of valid hash values, he could not circumvent the verification process.

Figure 4:
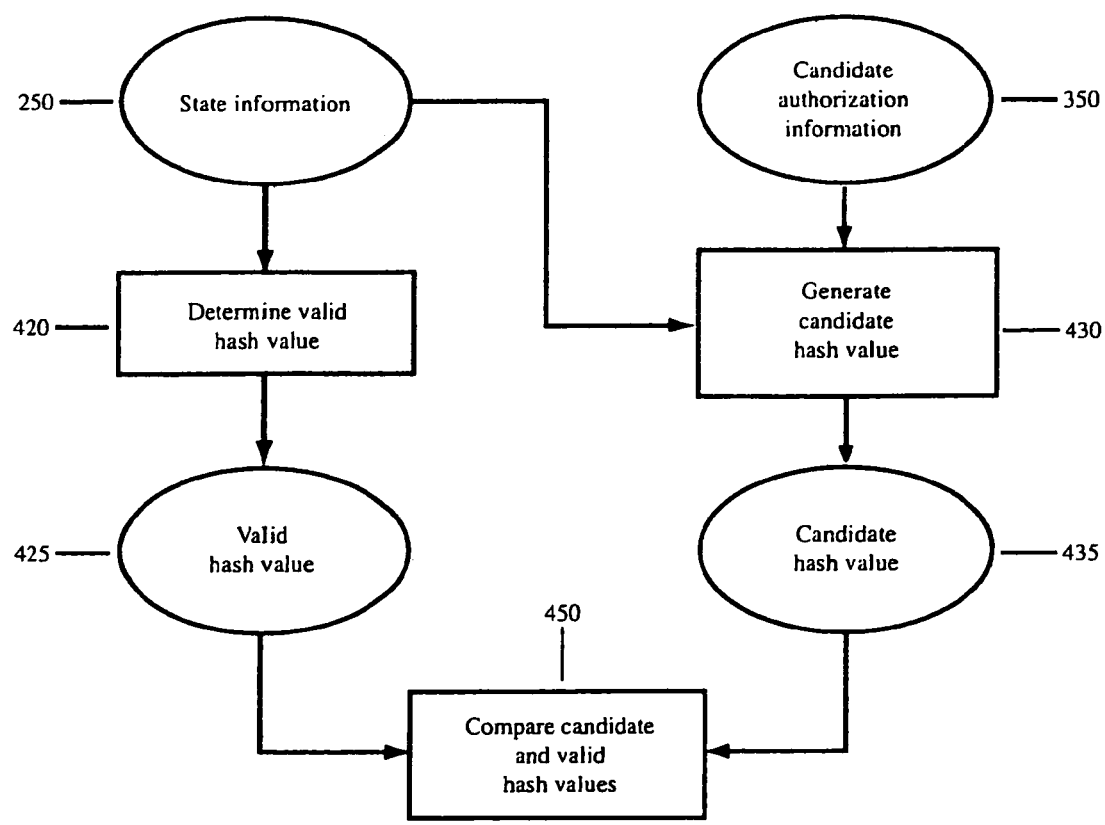
FIG. 4 is a flow chart that shows a verification operation according to an alternative embodiment of the invention.

FIG. 4 is a flow chart that shows a verification operation according to an alternative embodiment of the invention. The state information 250 is used to determine 420 a valid hash value 425. The candidate authorization information 350 and the state information 250 are used to generate 430 a candidate hash value 435 by means of a one-way hashing algorithm. For example, the candidate authorization information may be catenated with the state information prior to being operated on by the hashing algorithm. As in the preferred embodiment of the invention, the candidate hash value and the valid hash value are then compared 450. If the candidate hash value and valid hash value match one another, the verification operation is successful. If the candidate hash value and the valid hash value do not match one another, the verification operation is unsuccessful.

In this embodiment of the invention, because the state information is operated on by the hashing algorithm, the state information is discretized so that a successful comparison of the candidate hash value with the valid hash value is possible. For example, the state information may be thresholded, truncated, or rounded to a desired degree of precision before being operated on by the hashing algorithm.

Alternatively, the state information passed to the hashing algorithm may be replaced by a state information entry located within a table of state information.

Figure 5:
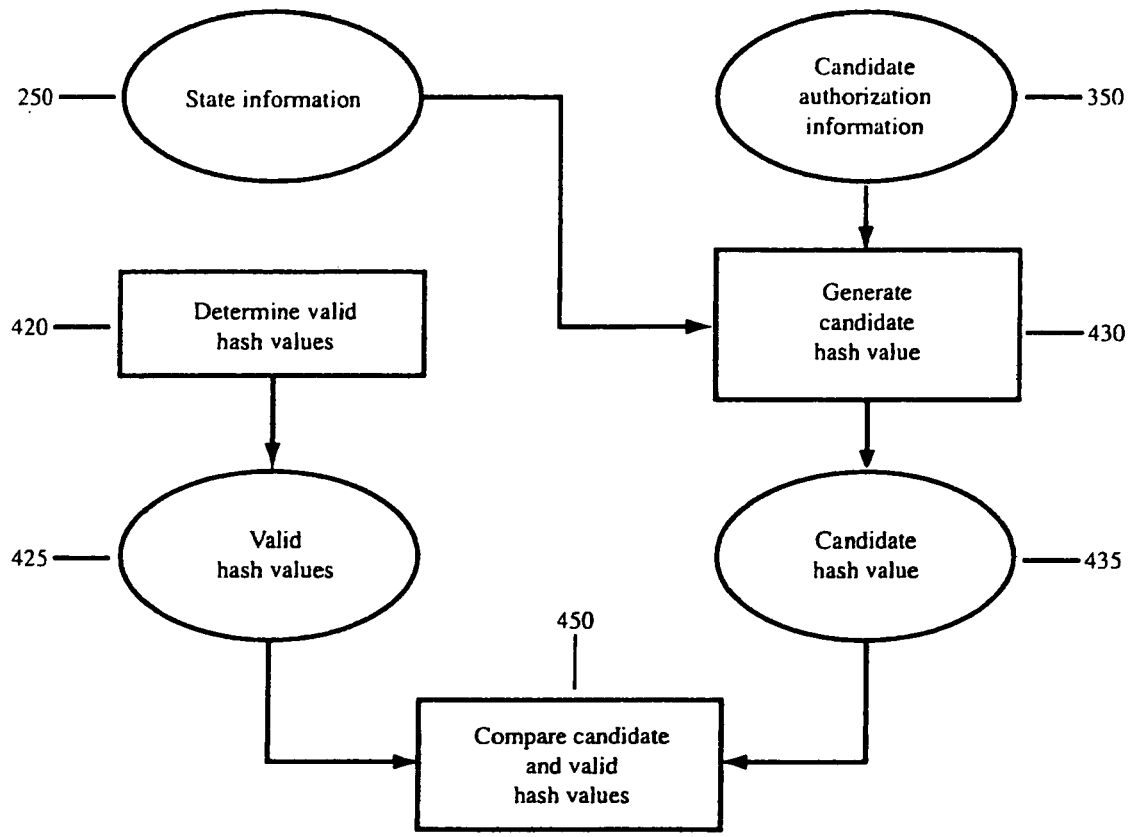
FIG. 5 is a flow chart that shows a verification operation according to another alternative embodiment of the invention.

FIG. 5 is a flow chart that shows a verification operation according to another alternative embodiment of the invention. The candidate authorization information 350 and the state information 250 are used to generate 430 a candidate hash value 435 using a one-way hashing algorithm. However, in this embodiment, the state information is not used to determine a single valid hash value. Rather, to determine valid hash values 420, a list of valid hash values is referenced. The list of valid hash values contains hash values generated by applying the hashing algorithm to state information and candidate authorization information pairings determined by the designer or distributor of the device. As in the preferred embodiment of the invention, the candidate hash value and the valid hash values are then compared 450. If the candidate hash value matches one of the valid hash values in the list of valid hash values, the verification operation is successful. Otherwise, the verification operation is unsuccessful.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

The invention claimed is:

1. A system for selectively enabling a microprocessor-based system, comprising:
    (A) circuitry for obtaining state information describing at least one microprocessor-based system operating condition;
    (B) a memory for storing said state information;
    (C) circuitry for determining at least one valid hash value;
    (D) circuitry for obtaining candidate authorization information from a user of said microprocessor-based system;
    (E) circuitry for generating a candidate hash value by applying a hashing algorithm to at least:
        (1) said candidate authorization information, and
        (2) said state information describing at least one microprocessor based system operating condition;
    (F) circuitry for comparing said candidate hash value and said at least one valid hash value;
    (G) circuitry for enabling said microprocessor-based system if said candidate hash value matches said at least one valid hash value;
    (H) circuitry for periodically checking for a reset condition after said enabling said microprocessor-based system if said candidate hash value matches said at least one valid hash value; and
    (I) upon detecting a reset condition:
        (1) circuitry for executing a power-down sequence;
        (2) circuitry for waiting for a power-up condition; and
        (3) upon detecting said power-up condition:
            (a) circuitry for executing a power-up sequence.

2. The system of claim 1, wherein said circuitry for determining at least one valid hash value includes:
    circuitry for determining said at least one valid hash value based on said state information describing at least one microprocessor-based system operating condition.

3. The system of claim 1, wherein said circuitry for determining at least one valid hash value includes:
    circuitry for referencing a list of valid hash values.

4. The system of claim 1, further comprising:
    circuitry for executing a power-up sequence before said obtaining state information describing at least one microprocessor-based system operating condition.

5. The system of claim 1, further including:
    circuitry for obtaining additional state information; and
    circuitry for storing said additional state information in said memory.

6. The system of claim 1, wherein said memory is a tamper resistant, non-volatile memory.

7. The system of claim 1, wherein said circuitry for obtaining state information describing at least one microprocessor-based system operating condition includes:
    circuitry for retrieving at least a portion of said state information describing at least one microprocessor-based system operating condition from said memory.

8. The system of claim 1, wherein said hashing algorithm is a one-way hashing algorithm.

9. The system of claim 2, wherein said circuitry for determining said at least one valid hash value includes:
    circuitry for locating said at least one valid hash value within a table of valid hash values indexed by said state information describing at least one microprocessor-based system operating condition.

10. The system of claim 1, wherein said circuitry for generating a candidate hash value by applying a hashing algorithm to at least said candidate authorization information and said state information includes:
    circuitry for applying said hashing algorithm to a catenation of said candidate authorization information and said state information describing at least one microprocessor-based system operating condition.

11. The system of claim 1, wherein said state information describes any of:
   a geographic location;
   a geographic region;
   a date;
   a range of dates;
   a time; and
   a range of times.

12. The system of claim 5, wherein said additional state information describes a prior usage history of said microprocessor-based system.

* * * * *

UNITED STATES PATENT AND TRADEMARK OFFICE
CERTIFICATE OF CORRECTION

| | | |
|---|---|---|
| PATENT NO. | : 7,962,760 B2 | |
| APPLICATION NO. | : 12/455670 | |
| DATED | : June 14, 2011 | |
| INVENTOR(S) | : W. Daniel Hillis and Bran Ferren | |

It is certified that error appears in the above-identified patent and that said Letters Patent is hereby corrected as shown below:

*Please insert* the following paragraphs to the patent, on page 1, column 1, line 4, *prior to the paragraph* stating "For purposes of the USPTO extra-statutory requirements, the present application constitutes a continuation in part of United States Patent Application entitled, METHOD AND APPARATUS FOR SELECTIVELY ENABLING A MICROPROCESSOR-BASED SYSTEM naming W. Daniel Hillis and Bran Ferren as inventors, filed Jun. 4, 2009, application Ser. No. 12/455,673...":

(New)
--CROSS-REFERENCE TO RELATED APPLICATIONS

The present application is related to and claims the benefit of earliest available effective filing date(s) from the following listed application(s) (the "Related Applications") (e.g., claims earliest available priority dates for other than provisional patent applications; claims benefits under 35 USC § 119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:
For purposes of the USPTO extra-statutory requirements, the present application constitutes a continuation-in-part of United States Patent Application entitled METHOD AND APPARATUS FOR SELECTIVELY ENABLING A MICROPROCESSOR-BASED SYSTEM, naming W. Daniel Hillis and Bran Ferren as Inventors, filed 20 December 2002, Application Serial Number 10/327,015, which is currently co-pending, or is an application of which a currently co-pending application is entitled to the benefit of the filing date.--

*Please insert* the following paragraphs to the patent, on page 1, column 1, line 14, *following the paragraph stating*

"For purposes of the USPTO extra-statutory requirements, the present application constitutes a Signed and Sealed this
Twentieth Day of December, 2011

David J. Kappos
*Director of the United States Patent and Trademark Office*

CERTIFICATE OF CORRECTION (continued)
U.S. Pat. No. 7,962,760 B2 continuation in part of United States Patent Application entitled, METHOD AND APPARATUS FOR SELECTIVELY ENABLING A MICROPROCESSOR-BASED SYSTEM naming W. Daniel Hillis and Bran Ferren as inventors, filed Jun. 4, 2009, application Ser. No. 12/455,673....":

(New)
--The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette November 8, 2005, available at http://www.uspto.gov/web/offices/com/sol/og/2003/week11/patbene.htm. The present Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Application and of any and all parent, grandparent, great-grandparent, etc. applications of the Related Applications is incorporated herein by reference to the extent such subject matter is not inconsistent herewith.--